Aug. 31, 1954

G. HILL ET AL 2,687,819

LABELING MACHINE

Filed April 2, 1952

INVENTORS
GORDON HILL
FRED L. BENNETT
BY Evans & McCoy
ATTORNEYS

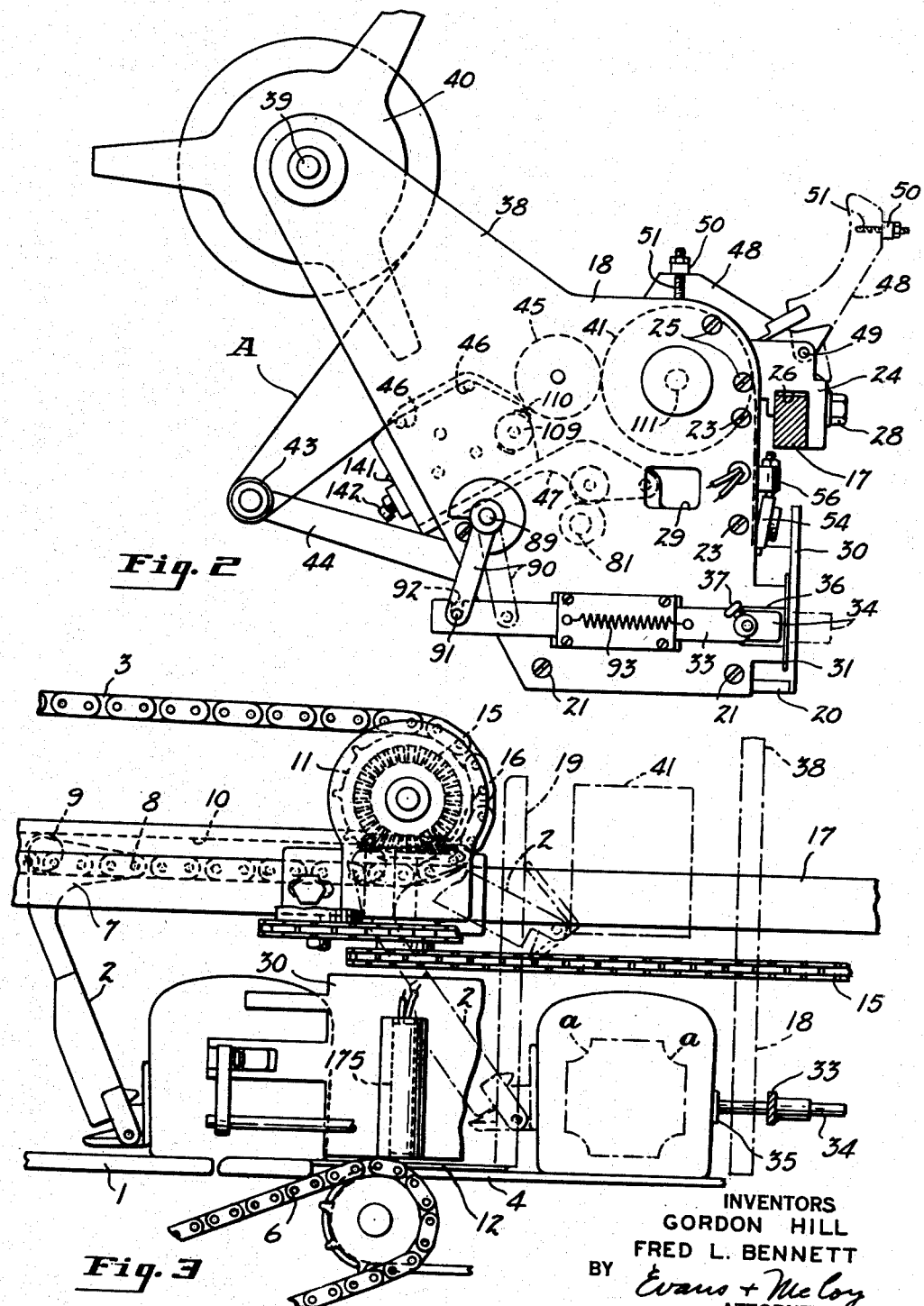

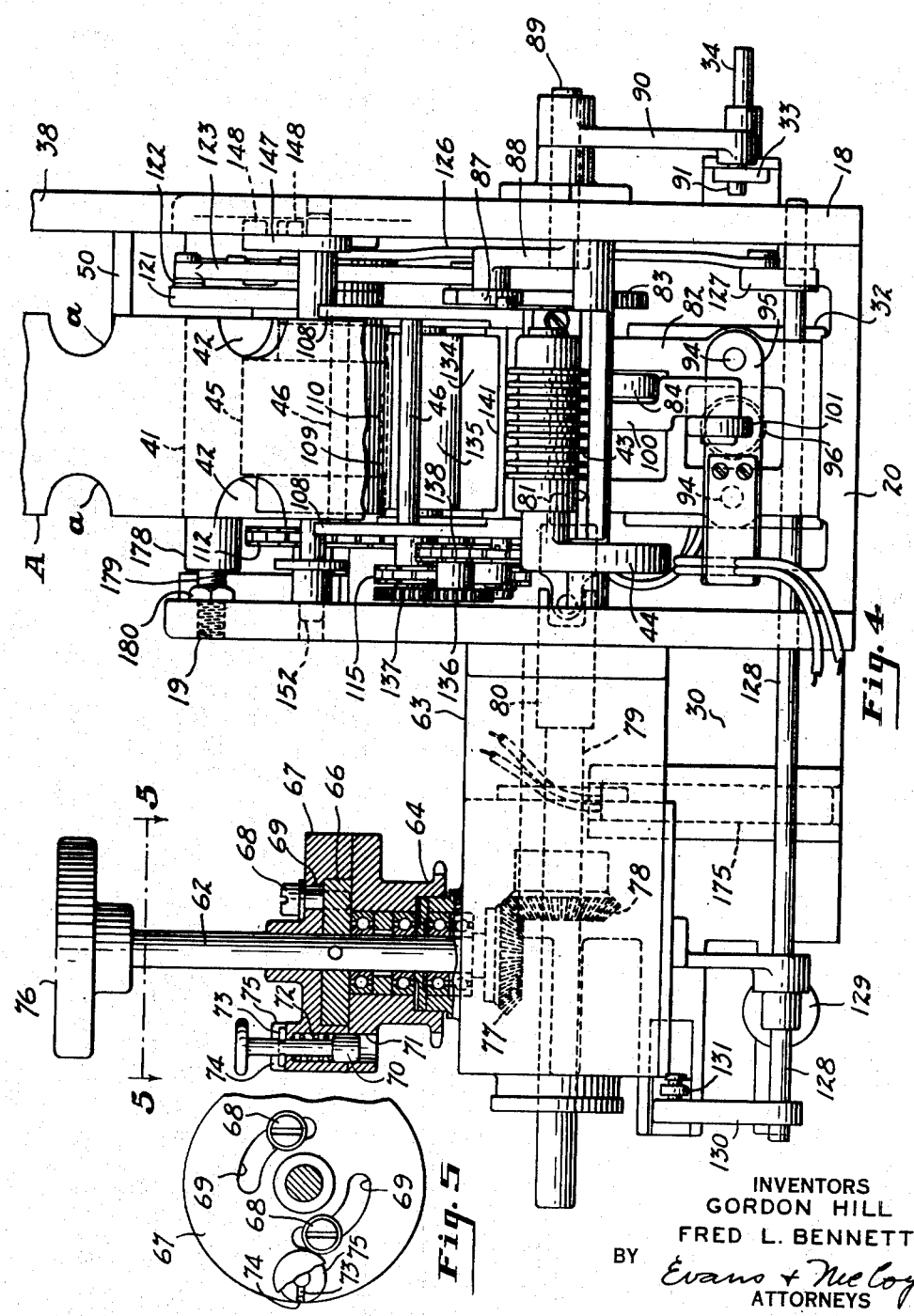

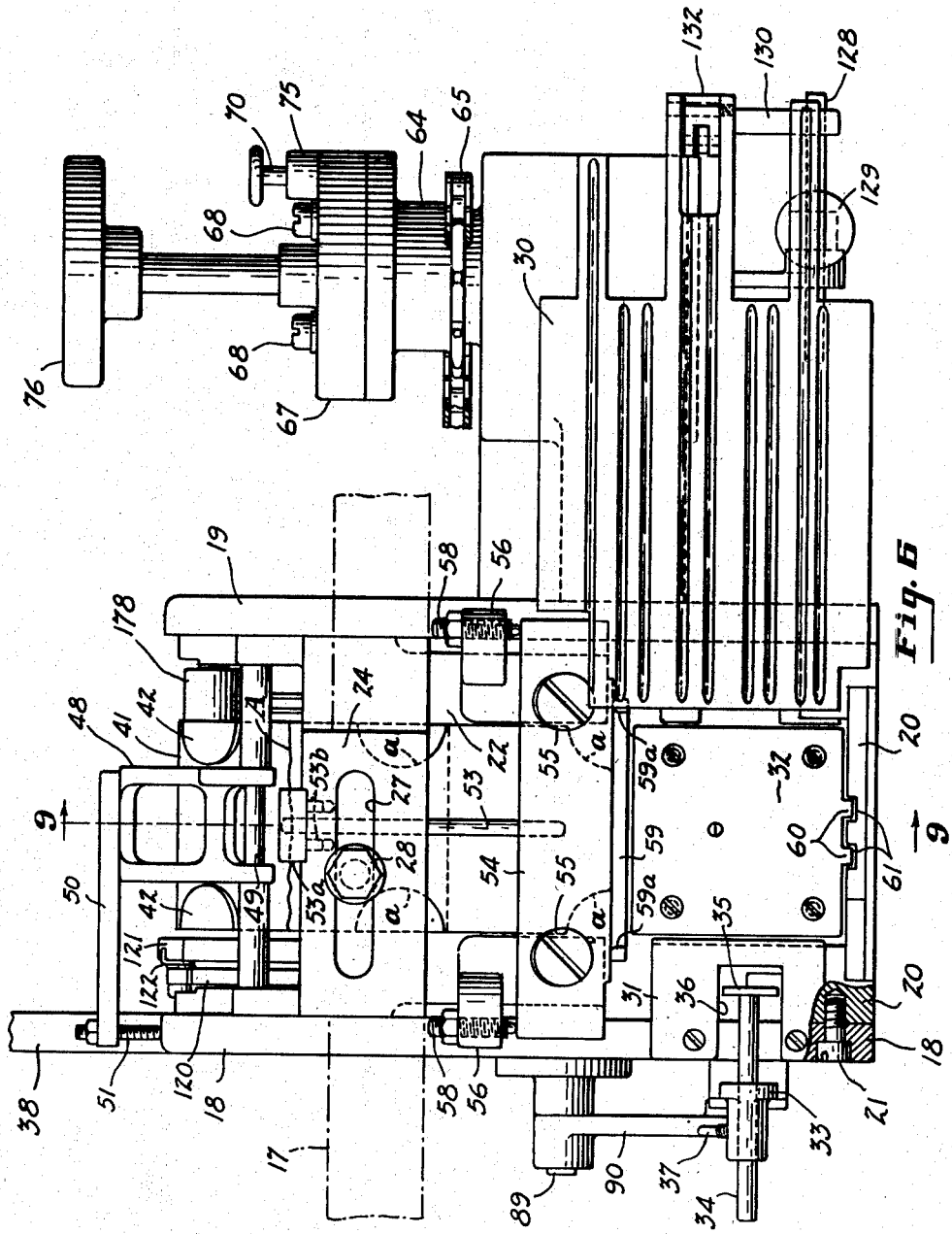

Aug. 31, 1954

G. HILL ET AL 2,687,819

LABELING MACHINE

Filed April 2, 1952

INVENTORS
GORDON HILL
FRED L. BENNETT
BY Evans & McCoy
ATTORNEYS

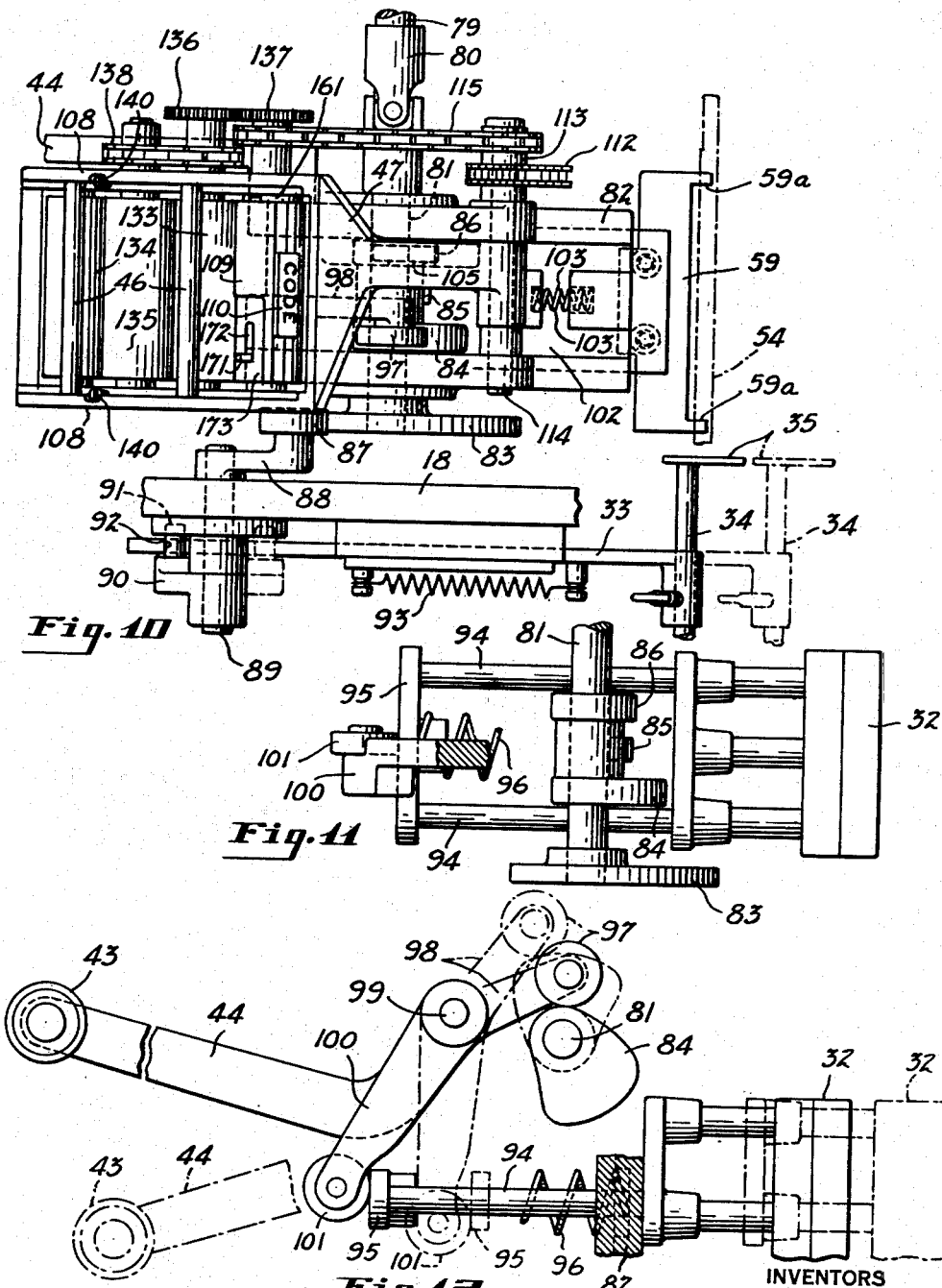

INVENTORS
GORDON HILL
FRED L. BENNETT
BY Evans + McCoy
ATTORNEYS

INVENTORS
GORDON HILL
FRED L. BENNETT

Patented Aug. 31, 1954

2,687,819

UNITED STATES PATENT OFFICE 2,687,819

LABELING MACHINE

Gordon Hill, Bettendorf, and Fred L. Bennett, Le Claire, Iowa, assignors, by mesne assignments, to Bettendorf Bakery Equipment Company, Bettendorf, Iowa, a corporation of Iowa Application April 2, 1952, Serial No. 280,136

17 Claims. (Cl. 216—2)

This invention relates to labeling machines and particularly to a labeling machine suitable for applying labels to wrapped articles in the discharge runway of a wrapping machine of the type employed for wrapping bread.

The labeling machine of the present invention is designed to apply labels to successive articles conveyed to the labeling machine. The labeling machine has label applying means that is geared to the conveying mechanism for operation in timed relation with respect thereto and has a label feed mechanism that is normally disconnected from the driving mechanism but which is connected to the driving mechanism to advance a label strip one label length by each article as it approaches the label applying station.

The machine of the present invention is preferably of the type in which the labels are severed from the leading end of a label strip and delivered to the label applying means and in which the label strip is fed by means of a drum provided with peripheral projections that engage in indentations or openings in the label strip. Means is provided for preventing movement of the portion of the label strip on the drum adjacent the projections away from the drum surface so as to maintain a driving connection between the label strip and the drum regardless of whether the portion of the strip passing over the drum is under tension. The strip is preferably fed from a rotatably supported roll to the drum which is intermittently driven with dwell periods between successive actuations. During each dwell period a slack loop is formed in the strip between the roll and drum while the strip is clamped adjacent the drum to prevent a reverse pull on the portion of the strip engaging the drum, and during each actuation of the drum the strip is drawn from the slack loop to the drum so that the portion of the strip acted upon by the drum is not under tension.

The clamping means is preferably in the form of a printing member that is operated during dwell periods of the drum to clamp the strip and to print desired data on the individual labels.

The printing attachment preferably includes a printing roller and inking rollers mounted on an arm that is actuated during each cycle of the labeling machine to bring the printing roller into engagement with the label strip, the printing roller being geared to the strip feeding drum to turn while the drum is turning so that type carried thereby is movable from its label engaging position to a position in engagement with an inking roller upon each actuation of the drum.

The articles are preferably carried to the labeling mechanism on a traveling support such as an endless belt to which the articles are delivered at predetermined time intervals and are stopped at the labeling station by a stop member that is moved into and out of the path of the articles on the conveyor in timed relation to the actuations of the label applying means.

The label applying means, the cutter and the article stop are all operated by the labeler driving mechanism at timed intervals corresponding to the delivery of articles to the labeling mechanism. The strip feed mechanism, however, is normally disconnected from the labeler driving mechanism and its operation is controlled by a trip engaged by an article as it approaches the stop, each actuation of the strip feed mechanism serving to advance the label strip one label length at the proper time to bring the label at the leading end of the label strip in position to be severed from the strip by the cutter and to be applied to the article engaging the stop by the label applying means.

The invention has for its object to provide a labeling machine that is of simple and relatively inexpensive construction, that is of compact and rugged construction and that is efficient in operation and that is operable to apply labels to articles delivered thereto at timed intervals.

A further object of the invention is to provide a labeling machine of the character referred to in which the operating mechanism is simplified by providing a label applying mechanism that is operated cyclically and a label feeding mechanism that is controlled by the articles approaching the labeling position.

A further object of the invention is to provide an improved strip feed by the use of an intermittently operable strip feeding device that receives the strip from a slack loop between the strip feeding device and a strip roll support, loop forming and strip clamping means being provided between the feeding device and roll support that are operable in the intervals between actuations of the strip feeding device.

A further object of the invention is to provide a strip clamping device in the form of a printing attachment that is operable not only to clamp the strip during the loop forming operation, but also to print desired data on each of the labels.

Reference should be had to the accompanying drawings forming a part of this specification in which:

Fig. 2 is a side elevation of the labeling machine viewed from the forward side thereof;

Fig. 3 is a fragmentary side elevation of a portion of the discharge runway of a wrapping machine showing a portion of the labeling machine mounted at one side of the runway;

Fig. 4 is a rear elevation of the labeling machine;

Fig. 6 is a front elevation of the labeling machine viewed from the wrapping machine runway;

Fig. 9 is a fragmentary vertical section taken on the line indicated at 9—9 in Fig. 6;

Fig. 10 is a plan view of the cam shaft, the clamping and printing unit, the cutter and the article stop mechanism viewed as indicated at 10—10 in Fig. 7;

Fig. 11 is a fragmentary plan view of the cam shaft and plunger operating mechanism viewed as indicated at 11—11 in Fig. 7;

Fig. 12 is a side elevation of the mechanism shown in Fig. 11;

Figure 1:
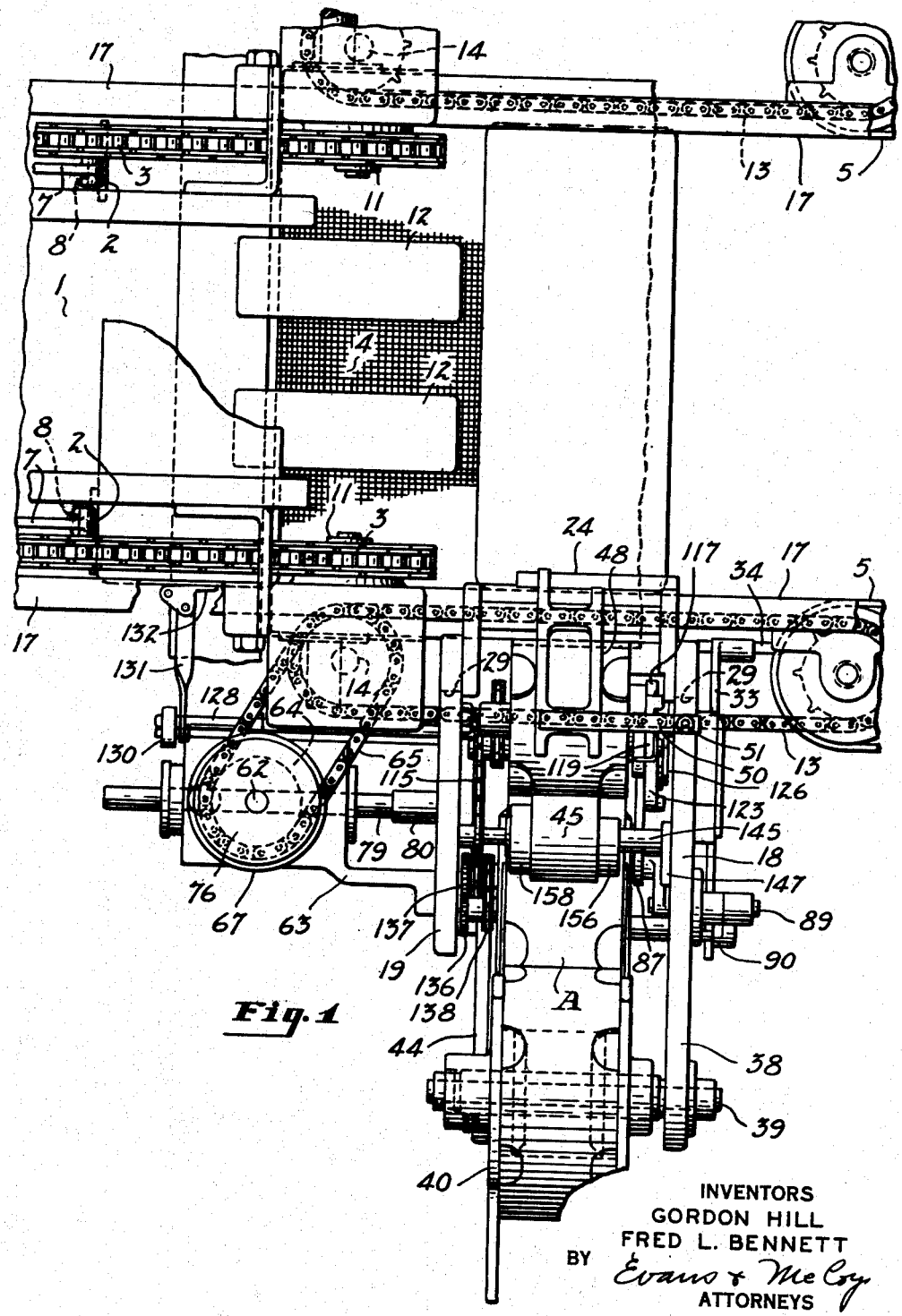
Figure 1 is a top plan view of a labeling machine embodying the invention and a portion of a wrapping machine upon which the labeling machine is mounted.

In the accompanying drawings the labeling machine of the present invention is shown as an attachment for a bread wrapping machine, being positioned to apply labels to an end of a wrapped bread loaf during its passage through the discharge runway of the wrapping machine. As shown in Figs. 1 and 3, the labeling machine is attached to the discharge runway of a bread wrapping machine intermediate the heat sealing and cooling portions of the discharge runway. As herein shown the heat sealing portion of the runway is provided with a bed 1 over which the wrapped loaves of bread are advanced by means of pusher arms 2 that are carried by laterally spaced endless chains 3 that are a continuously driven part of the wrapping machine.

During passage through the heating and sealing channel the end flaps of the wrapper are folded against the end of the loaf and the overlapping folds at the ends and along the bottom of the loaf are heated to fuse their coatings of wax or other thermoplastic adhesive to cause the overlapped folds to adhere together. From the heating and sealing channel the wrapped loaves pass to a cooling section having a bottom belt 4 upon which the wrapped loaves are supported and side belts 5 which engage the ends of the wrapped loaves. During passage through the cooling section the thermoplastic material solidifies to seal the package.

The supporting belt 4 is continuously driven by a chain 6 from the wrapping machine so that the speed of the belt 4 is always at a fixed ratio with respect to the speed of the pusher arms 2. The pushers 2 have L-shaped ends 7 that are connected to the chains 3 by pivots 8 and are provided rearwardly of the pivots with rollers 9 that travel in grooves of guide rails 10 along opposite sides of the runway. The guide rails 10 terminate adjacent the forward sprockets 11 of the chains 3 so that after the wrapped articles have been advanced to a predetermined point the arms 2 are released and permitted to swing rearwardly out of engagement with the article. There is a slight slippage between the belt 4 and the articles being labeled during the labeling operation and, in order to minimize the transfer of wax from the wrappers to the supporting belt, thin plates 12 are attached to the forward end of the bed 1 and overlie the receiving end of the belt 4 so that the wrapped articles are supported clear of the belt 4 for a short period of time as they pass onto the belt 4 to permit the wax or other thermoplastic coating material to solidify before the article is deposited on the belt.

The position of the rear ends of the guide rails 10 is such that the pushers 2 advance the loaves entirely across the plates 12 and onto the belt 4 before they are released. The side belts 5 are driven at the same speed as the belt 4 by means of sprocket chains 13 that are driven by a vertical shaft 14 alongside the sprockets 11, the shaft 14 being driven by bevel gears 15 and 16 from the sprockets 11. The endless pusher chains 3 and belts 5 are mounted on longitudinal side rails 17 which are ordinarily adjustable laterally to accommodate articles of different lengths.

The labeling machine of the present invention is mounted on a side rail 17 in position to apply labels to packages resting on the belt 4 between the ends of the plates 12 and the side belts 5. Usually two labeling machines are employed directly opposite each other and geared to the wrapping mechanism to apply labels simultaneously to opposite ends of the packages. Only one labeling machine is illustrated herein, it being understood that the two labelers are substantially identical except for right and left hand parts.

The labeling machine has a frame provided with front and rear vertical side plates 18 and 19 the lower edges of which are connected by a base plate 20 that is rigidly attached to the plates 18 and 19 by means of screws 21. A vertical guide plate 22 is mounted between the side plates 18 and 19 adjacent the inner vertical edges thereof that face the article runway, the guide plate 22 being secured to the side plates 18 and 19 by screws 23. The labeling machine is supported on the wrapping machine frame and is attached to the side rail 17 for lateral movement therewith by means of a bracket 24 attached to the plates 18 and 19 by screws 25. The bracket 24 projects inwardly from the plates 18 and 19 and has a downwardly facing channel 26 that receives the rail 17. As shown in Fig. 6, the channel portion of the bracket 24 is provided with a longitudinal slot 27 that receives a clamping bolt 28 that screws into the rail 17 and serves to adjustably secure the labeling machine to the side rail. The labeling machine is attached to the rail 17 between the sprockets 11 and the belts 5 and is so positioned that the inner edges of the frame plates 18 and 19 are disposed outwardly of the inner run of the chain 13 and inwardly of the outer run, the frame plates 18 and 19 being provided with windows 29 through which the outer run of the chain 13 passes.

The side plates 18 and 19 have guide plates 30 and 31 attached to their inner edges which form portions of the guide wall of the wrapping machine discharge runway, the plate 30 extending rearwardly to and being in alinement with the side plates of the folding and sealing channel, and the guide plates 31 serving to guide the articles as they pass rearwardly from their label receiving position.

A label applying plunger 32 is mounted for horizontal movement between the plates 18 and 19 and through an opening between the plates 30 and 31 to press a label against an end of an article in the runway. In order to insure accurate positioning of the labels on the package, means is provided for momentarily arresting the movement of the package while the label is being pressed against the package by the plunger 32. To position the article for the label applying operation, a stop bar 33 is slidably mounted for horizontal movement on the rear side plate 18. The stop bar 33 is positioned at right angles to the runway and at its inner end has a rod 34 slidably mounted thereon that is disposed at right angles to the bar 33 and longitudinally of the runway. The rod 34 carries to a stop plate 35 at its rear end with which the article to be labeled engages. The stop bar 33 is moved inwardly and outwardly to move the stop plate 35 into and out of article intercepting position at predetermined time intervals corresponding to the time intervals at which the articles are delivered to the belt 4 by the pushers 2. The guide plate 31 is provided with a slot 36 through which the rod 34 and plate 35 pass in their movement into and out of article intercepting position. In order to correctly position labels on articles of various sizes, the rod 34 is adjustable longitudinally in the bar 33 and is held in adjusted position by means of a set screw 37.

Figure 15:
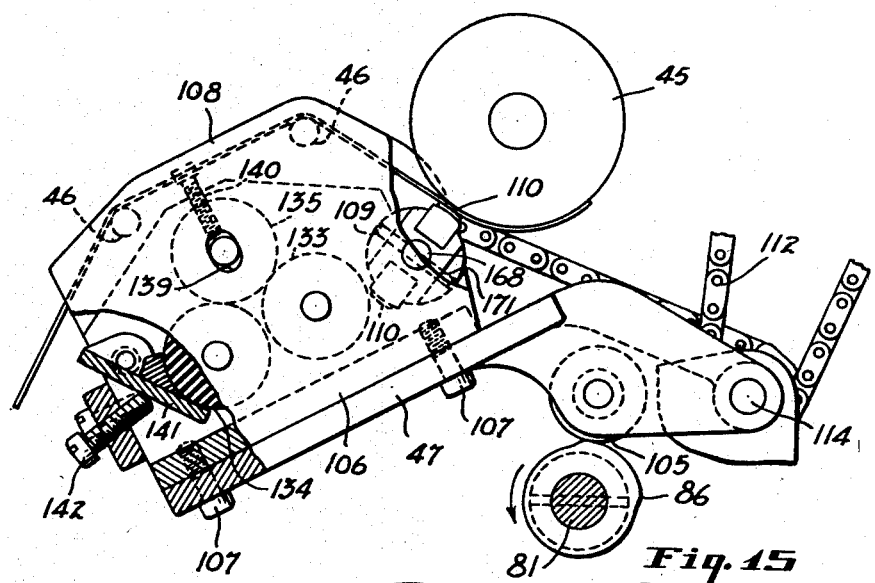
Fig. 15 is a side elevation of the strip clamping and printing attachment viewed from the front side.

The forward side plate 18 of the labeler frame has an upwardly and outwardly extending arm 38 to the upper end of which is attached a horizontal shaft 39. The shaft 39 provides support for a rotatable reel 40 that is adapted to receive a roll of label strip A which supplies the labels that are applied to the articles as they are moved past the labeling machine. The label strip A is preferably formed with indentations a that are arranged in transverse alinement between successive labels. The label strip passes from the reel 40 over an intermittently actuated feed drum 41 that is journaled in the plates 18 and 19 adjacent the tops thereof. The drum 41 has regularly spaced projections 42 that are engageable in the indentations a of the label strip. Between the reel 40 and the drum 41 there is a loop forming roller 43 that overlies the label strip A and that is carried by a vertically movable arm 44 that is moved downwardly at predetermined time intervals to form a slack loop between the reel 40 and the drum 41. The strip A passes over the top of the drum 41 and beneath a guide roller 45 which is positioned adjacent the drum at the outer side thereof. Means including a vertically movable arm 47 is provided for clamping the strip A to the roller 45 as shown in Figs. 2 and 15 while the roller 43 is being moved downwardly to form a loop.

Figures 7, 8:
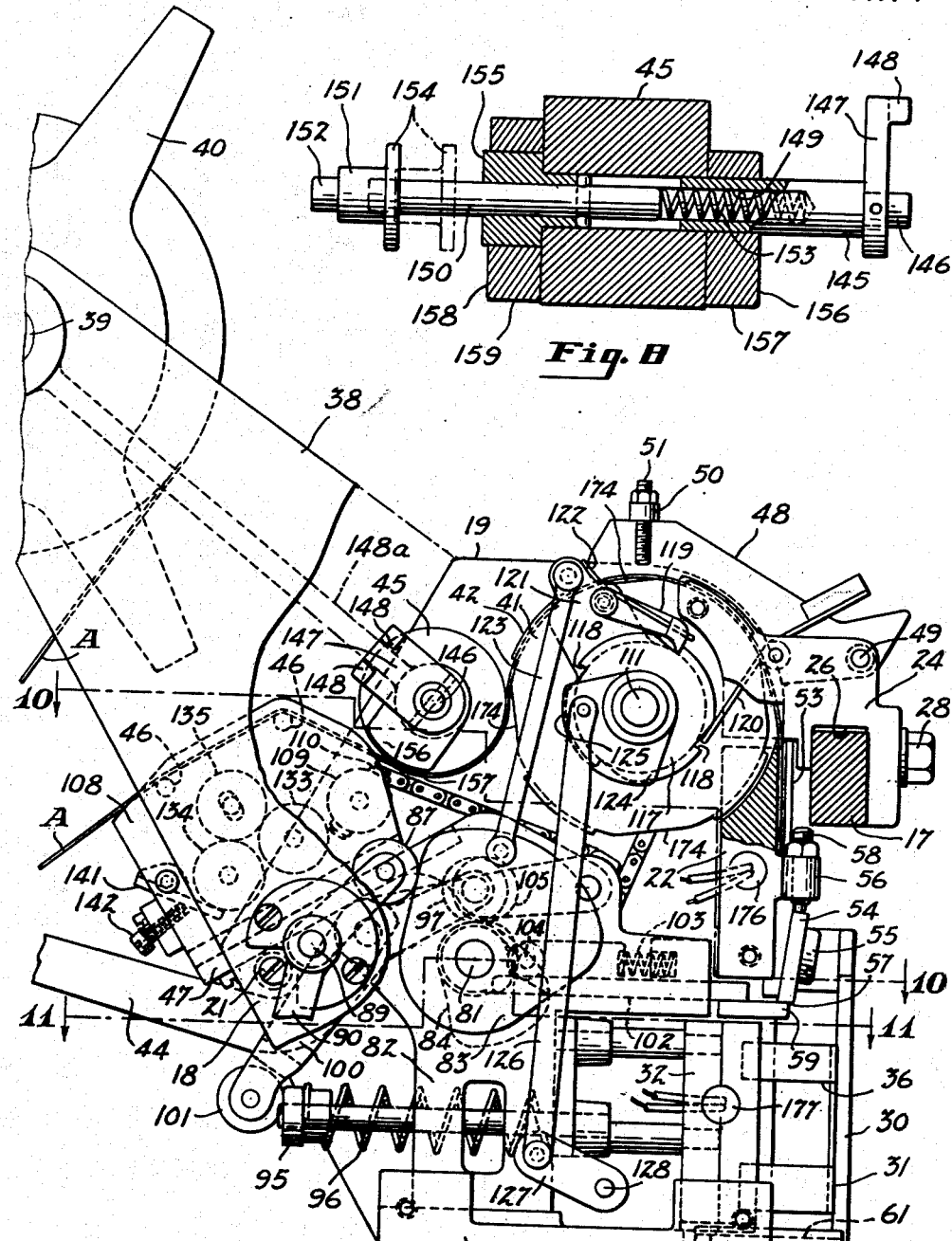
Fig. 7 is a side elevation of the labeling machine looking from the rearward side, a portion of the rear side plate being broken away to show the operating mechanism.
Fig. 8 is a view partially in axial section of the guide roller detached.

During turning movements of the drum 41 the label strip is advanced and the strip is drawn from a slack loop previously formed by the roller 43. In order to maintain driving engagement between the feed drum 41 and the label strip without tensioning the strip, an arcuate guide 48 closely overlies the top of the drum 41 between the projections 42 as shown in Figs. 7 and 9 to prevent movements of the strip that would disengage the projections 42 from the indentations A of the strip. The guide 48 is connected by a horizontal pivot 49 to the bracket 24 and is supported by a laterally projecting arm 50 that projects over the top edge of the plate 19. A vertically adjustable supporting screw 51 in the arm 50 supports the guide on the top edge of the side plate 19 and, by adjustment of the screw 51, the space between the arcuate underside of the guide 48 and the cylindrical drum 41 may be accurately regulated.

The guide plate 22 has a beveled top edge 52 closely underlying the inner portion of the feed drum 41 and a vertical guide bar 53 disposed centrally of the plate 22 and spaced inwardly a short distance therefrom is detachably mounted on the bracket 24, the bar 53 having a head 53a that overlies the top of the bracket 24 and that has dowel pins 53b that engage in sockets in the top of the bracket. The leading end of the label strip is directed downwardly by the arcuate guide 48 into the space between the guide plate 22 and guide bar 53 and past the inner face of a horizontal shear plate 54 that is attached at its opposite ends by screws 55 to brackets 56 integral with the plate 22. The horizontally extending shear plate 54 is inclined at a small angle to the vertical to provide an acute angled cutting edge 57 at its lower outer edge. Guide screws 58 extend through openings in the plate 54 that are slightly larger than the screws so that the plate may be pressed by adjusting screws 58 that engage the top edge of the plate 54 adjacent its opposite ends against the top of a movable shear bar 59. The shear bar 59 has extensions 59a at the ends thereof upon which the shear plate 54 rests when the shear bar is retracted.

Upon each actuation thereof the label feeding drum is turned through an angle corresponding to the angular spacing of its strip engaging projections to advance the label strip one label length and operation of the shear bar 59 is timed to sever the label immediately after each turning movement of the drum 41. The severed labels drop into the space between the plunger 32 and the article to be labeled and the plunger 32 is timed to press the label against the article to be labeled immediately after it is severed from the strip. The label drops into engagement with the bottom plate 20 and, in order to prevent the bottom edge of the label from being pulled beneath the inner end of the plunger, the under side of the plunger is provided with ribs 60 which slidably fit in grooves 61 formed in the plate 20 as best shown in Fig. 6.

The labeling machine is operated in timed relation to the wrapping machine and is preferably geared to the wrapping machine. As shown in Fig. 1, the labeling machine is driven from a vertical shaft 62 mounted in a bracket 63 attached to the side plate 19, the shaft 62 having a sprocket 64 attached thereto which is driven by a sprocket chain 65 from the vertical shaft 14, the labeling mechanism being thus directly geared to the article advancing conveyor.

Figure 5:
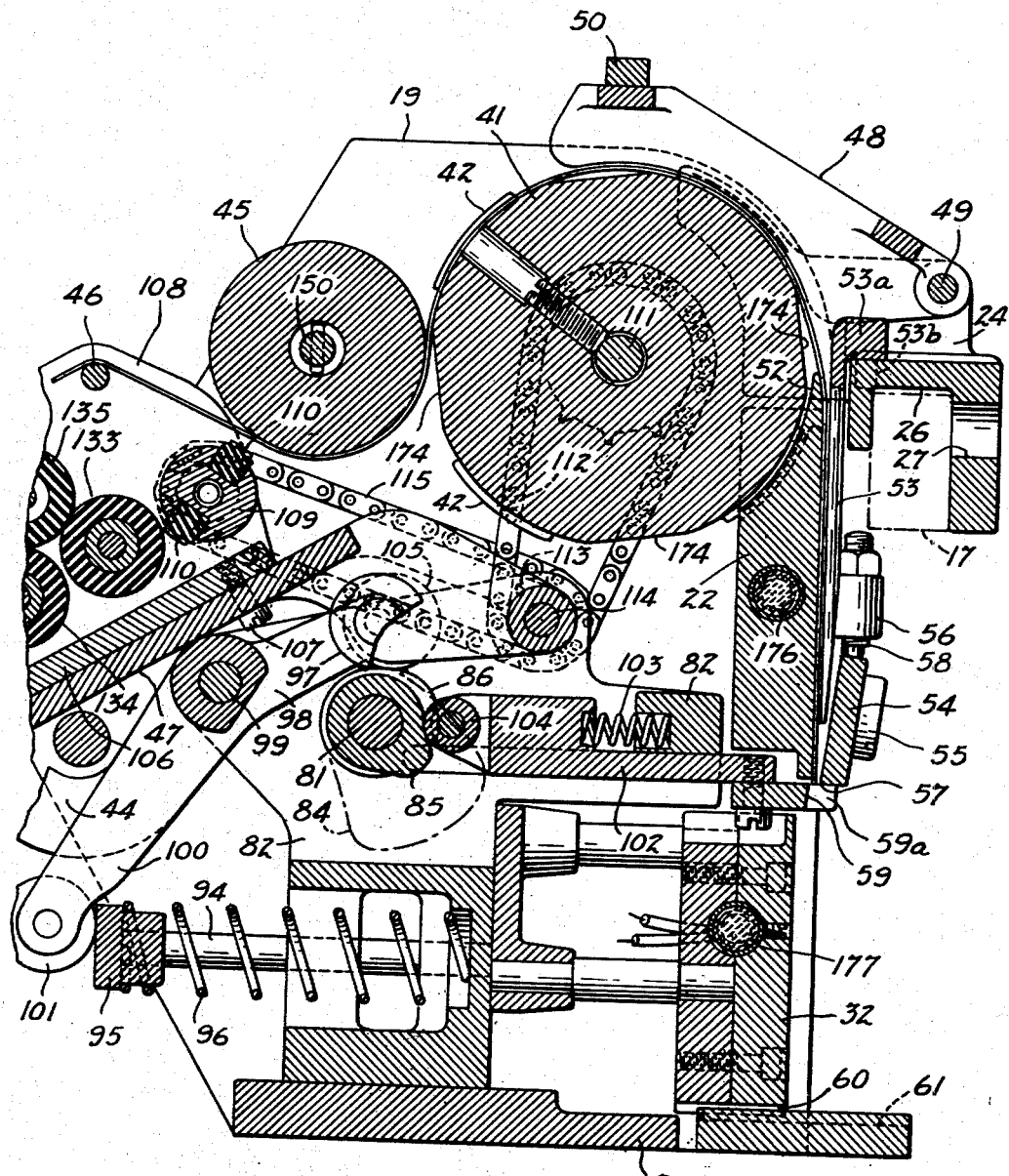
Fig. 5 is a section taken on the line indicated at 5—5 in Fig. 4, showing the means for adjustably attaching the clutch disk to the drive shaft of the labeling machine.

As best shown in Fig. 4, the labeling machine is driven through a releasable clutch mounted on the shaft 62. The clutch element that is rotatable with the shaft 62 comprises a disk 66 fixed to the shaft and a clutch plate 67 that is adjustably secured to the disk 66 by means of screws 68 that are threaded in the disk 66 and that pass through arcuate slots 69 in the plate 67, as shown in Fig. 5. By means of the screw and slot connection the clutch plate can be secured in different positions of angular adjustment with respect to the shaft 62 to properly correlate the operation of the labeler mechanism with respect to the article advancing conveyor.

The clutch plate 67 rests upon the top face of the sprocket 64 and carries a vertical pin 70 that is engageable in a single opening 71 formed in the sprocket 64. The pin 70 is pressed downwardly toward its engaging position by means of a coil spring 72 and the pin 70 is provided with a cross pin 73 that can be moved into alinement with notches 74 in a boss 75 in which the pin 70 is slidably mounted. When the pin 73 engages the top of the boss the pin 70 is held out of engagement with the sprocket 64 and the labeling mechanism is disconnected from the wrapping machine. When the pin 70 is turned to bring the pin 73 into line with the notches 74, the pin 70 can be moved downwardly by the spring 72 into engagement with the opening 71 to provide a driving connection between the wrapping machine and the labeling machine. If the pin 70 is out of alinement with the opening 71 when released it will ride upon the face of the sprocket and snap into engagement with the opening when the opening is brought into alinement therewith by rotation of the sprocket.

Whenever it is desired to discontinue the operation of the labeling machine it is merely necessary to lift the pin 70 and hold it in its disengaged position by engagement of the pin 73 with the top edge of the boss 75. Also the labeler may be started into operation at any time by shifting the pin 70 to its engaging position.

To facilitate the making and checking of adjustments of labeling machine elements, the shaft 62 is preferably provided with a handwheel 76 at its upper end by means of which the shaft 62 may be turned by hand to operate labeler mechanism when it is disengaged from the wrapping machine. The shaft 62 has a bevel gear 77 at its lower end which meshes with a bevel gear 78 on a horizontal shaft 79 journaled in the bracket 63. The shaft 79 is connected by a flexible coupling 80 to a cam shaft 81 that is journaled in a bracket 82 mounted on the base plate 20 between the side plates 18 and 19 of the labeling machine frame.

As best shown in Figs. 10 and 11 the cam shaft 81 has a cam 83 attached thereto at its forward end for actuating the stop bar 33, a cam 84 for operating the plunger 32, a cam 85 for operating the shear bar 59 and a cam 86 for actuating the clamping arm 47.

As shown in Figs. 7 and 10, a roller 87 engaged by the cam 83 is carried by an arm 88 attached to a horizontal shaft 89 journaled in the wall 18. An arm 90 attached to the shaft 89 exteriorly of the wall 18, as shown in Fig 2, extends downwardly from the shaft and has a pin 91 at its lower end that engages in a vertical slot 92 formed in the stop bar 33 adjacent its outer end. A spring 93 normally holds the stop bar 33 in its retracted position and the bar is actuated in opposition to the spring 93 by the cam 83.

As shown in Figs. 7, 9 and 12, the plunger 32 has horizontal guide rods 94 that are slidable in the bracket 82 and these rods are connected at their outer ends by a crosshead 95. A coil spring 96 is interposed between the bracket 82 and the crosshead 95 and act to urge the plunger toward its retracted position.

As best shown in Fig. 12, a roller 97 carried by an arm 98 is engaged by the cam 84. The arm 98 is attached to a horizontal shaft 99 journaled in the bracket 82 and the shaft 99 has a downwardly extending arm 100 that carries a roller 101 that engages with the cross bar 95. When the lever formed by the arms 98 and 100 is actuated by the cam 84 the plunger 32 is moved inwardly in opposition to its springs 96 to apply a label.

The arm 44 carrying the loop forming roller 43 is attached to the shaft 99 so that the roller 43 is moved downwardly to form a loop in the label strip while the plunger is being moved forwardly to apply a label to the package.

As shown in Figs. 9 and 10, the cutter bar 59 is carried by a slide 102 mounted on the bracket 82 and a spring 103 interposed between the slide 102 and the bracket 82 normally holds the shear bar 59 in retracted position. As best shown in Fig. 9, the cam 85 engages a roller 104 on the slide 102 to move the slide in opposition to the spring 103.

Figure 16:
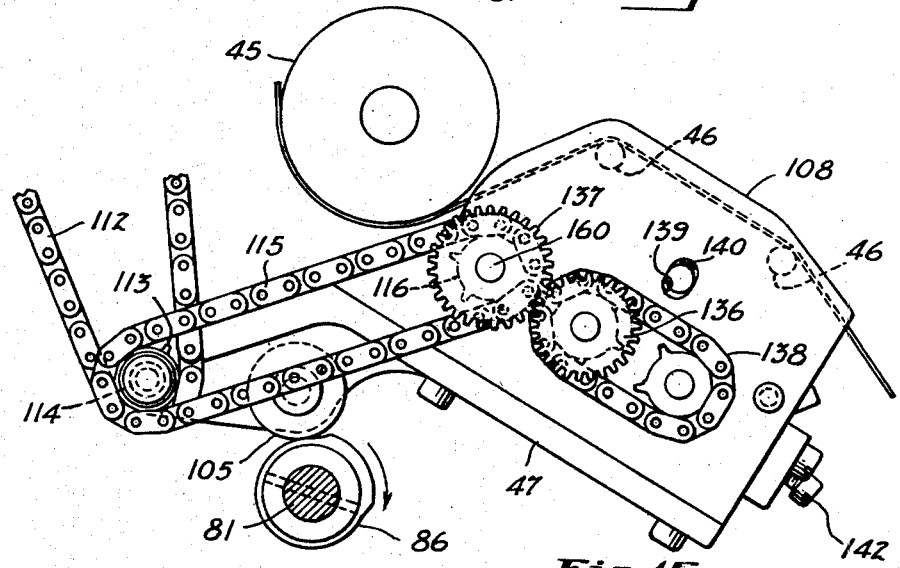
Fig. 16 is a side elevation of the strip clamping and printing attachment looking from the rear side.

The cam 86 engages a roller 105 on the arm 47 to move the arm to strip clamping position. The arrangement of the cams on the shaft 81 is such that the stop member 35 is first moved to article intercepting position, after which the shear bar 59 is moved to sever a label and the plunger 32 is simultaneously moved to press the label against an article engaging the stop member 35. While the plunger is being advanced the clamping arm 47 is moved to clamping position and the roller 43 is moved downwardly to pull a loop in the label strip. The clamping member carried by the arm 47 is preferably in the form of a printing attachment which serves to print data on each of the labels as well as to clamp the label strip. The printing attachment, best shown in Figs. 15 and 16, comprises a trough-shaped printing frame 106 attached by bolts 107 to the arm 47, the printing frame having side walls 108 between which there is mounted a combined printing and clamping roller 109. The roller 109 carries type 110 mounted in diametrically opposite longitudinal channels formed therein. The roller 109 is driven from the drum 41 during each turning movement of the drum to bring the rows of type 110 successively into engaging position with respect to the roller 45. The strip feeding drum 41 is attached to a shaft 111 journaled in the frame plates 18 and 19 and, as shown in Fig. 9, a sprocket chain 112 driven by the shaft 111 drives a sprocket 113 on a horizontal shaft 114 journaled in the bracket 82, which in turn drives a sprocket chain 115 which drives a sprocket 116 to which the printing roller 109 is attached.

Figure 13:
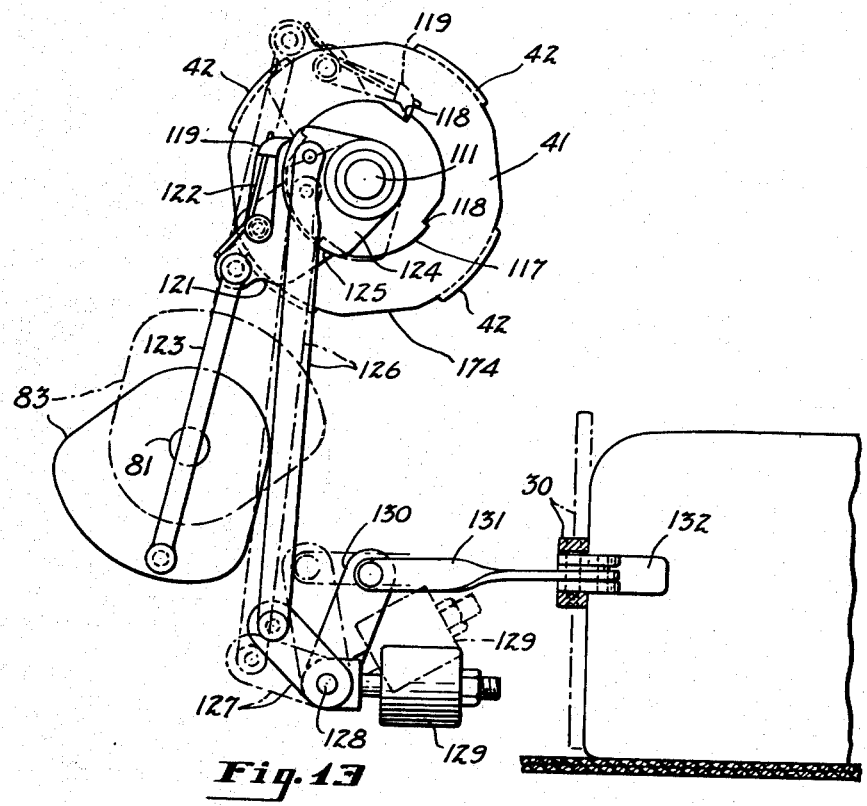
Fig. 13 is a side elevation of the drum indexing mechanism and the trip operated means controlling the operation thereof.
Figure 14:
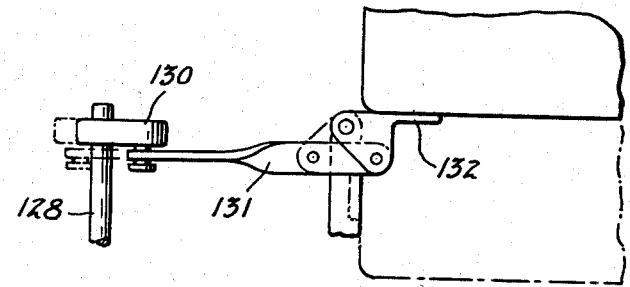
Fig. 14 is a fragmentary plan view of the article operating trip and its connection to the control shaft.

The drum 41 is intermittently actuated in timed relation to the cam operated parts of the labeling mechanism. As shown in Figs. 7 and 13, a ratchet 117 attached to the drum 41 is provided with teeth 118 spaced apart an angular distance corresponding to the angular spacing of the projections 42 on the drum, and the ratchet is engaged by an actuating pawl 119 by means of which it is turned in a direction to advance the strip and by a holding pawl 120 which prevents reverse rotation of the drum. The actuating pawl 119 is carried by an arm 121 that is pivoted to swing upon the drum shaft 111 and a spring 122 carried by the arm 121 presses the pawl 119 toward ratchet engaging position. A link 123 connects the actuating arm 121 to the cam 83 so that the arm 121 is oscillated during each revolution of the cam shaft 81.

The label feed drum 41 is actuated during a predetermined portion of the operating cycle of the labeling machine by means of the oscillating arm 121 and connecting link 123, but means is provided for preventing operation of the label feeding drum except when an article is approaching labeling position. To prevent operation of the drum by the cam 83, a sector-shaped guard 124 is provided that is pivoted on the drum shaft 111 and that has a peripheral portion 125 of greater radius than the ratchet 117 that engages with the pawl 119 to hold it out of engagement with the ratchet 117, the pawl 119 being slightly wider than the ratchet 117 and having a portion in the path of the guard.

The pawl guard 124 is connected by a link 126 to an arm 127 fixed to a shaft 128 that extends horizontally through the side plate 19 of the labeler frame and along the outer side of the guide plate 30. A weighted arm 129 attached to the shaft 128 normally holds the pawl guard 124 in a position to lock the ratchet. Adjacent its forward end the shaft 129 has an upwardly extending arm 130 that is connected by a horizontally extending link 131 to a trip member 132 that is preferably held by the weighted arm 129 in a position extending inwardly from the plate 30 into the path of an article advancing toward the labeling mechanism and as the article engages the trip member 132 the link 131 is moved outwardly to rock the shaft 128 in opposition to the weighted arm 129 and to retract the pawl guard 124 so that when the oscillating arm 121 is moved upwardly the ratchet will be turned one tooth space and the drum will be turned with it an angular distance corresponding to the spacing of the projections 42 to advance the label strip one label length.

When the labeling machine is being driven by the wrapping machine the cam shaft 81 will be turned through a complete revolution during the time interval between the delivery of successive packages to the belt 4. Regardless of whether a package is being delivered to the belt 4, the stop member will be advanced to article intercepting position, the shear bar will be actuated, the plunger will be moved to article engaging position, the strip will be clamped to the guide roller 45 and the loop forming roller 43 will be actuated. If there is no article approaching labeling position, the label feed drum will remain stationary and no label will be delivered to the label applying plunger. Whenever an article is advanced toward labeling position it will engage the trip 132 to shift the guard 124 out of pawl engaging position so that the label feeding drum will advance the label strip one label length. In the normal operation of the machine the articles will be fed regularly to labeling position and the drum will be actuated once during each cycle of the labeling mechanism to advance a label past the shear bar 59 just prior to actuation of the shear bar and will remain stationary during the remainder of the label applying cycle during which the plunger 32 is advanced, the stop bar 33 retracted and the label strip is clamped to the roller 45 by the printing attachment to hold the strip while a loop is drawn by the roller 43.

The printing attachment is preferably provided with inking rollers 133, 134 and 135 which serve to apply ink to one row of type 110 while the other row of type is in clamping position. The inking roller 133 has a gear 136 attached thereto that meshes with a gear 137 fixed to the sprocket 116 and the roller 134 is driven from the roller 133 by a sprocket chain 138. The gears 136 and 137 preferably have a different number of teeth so that the type will progressively engage different portions of the roller 133. The roller 135 rests in the bight of the rollers 133 and 134 and is guided for vertical movements in slots 139 in the walls 108. Backing screws 140 may be provided in the slots to regulate the pressure of the roller 135 against the rollers 133 and 134. An ink supporting plate 141 is pivoted to the side walls 108 of the printing attachment and is adjustable toward the roller 134 by means of screws 142.

In order to facilitate the threading of a label strip over the feed drum 41 the guide roller 45 preferably has a quick detachable mounting in the side walls 18 and 19 of the label frame. As shown in Fig. 8, the roller 45 is mounted on a shaft 145 that has a reduced end 146 that is journaled in a hole in the front wall 18. The reduced end 146 has an arm 147 attached thereto that engages the inner face of the wall 18 and that is provided with lugs 148 that straddle a rib 148a on the inner face of the wall 18 to hold the shaft 145 against rotation. The shaft 145 has a bore 149 that receives an extension shaft 150 that is keyed to the shaft 145 and that slides in the bore. The shaft 150 has an enlarged portion 151 at its outer end that is provided with a reduced portion 152 engageable in an opening in the wall 19. A spring 153 is mounted in the bore 149 and exerts a pressure on the shaft 150 tending to force it outwardly toward the wall 19 and the portion 151 is provided with a flange 154 which the operator can engage with his fingers to move the shaft 150 into the bore 149 and release the shaft 150 from the wall 19. By retracting the extension shaft 150 the guide roller 45 can be quickly and easily removed from or replaced in operative position.

The roller 45 is journaled between an enlargement 155 at the inner end of the shaft 145 and a block 156 attached to the shaft 145. The block 156 has an arcuate portion 157 that is substantially flush with the periphery of the roller 45 and that is positioned to back the portion of the strip engaged by the type roller. A block 158 is attached to the enlarged portion 155 of the shaft and has an arcuate portion 159 similar to the arcuate portion 157 of the block 156 which is also positioned to back the portion of the strip engaged by the printing roller.

Figure 17:
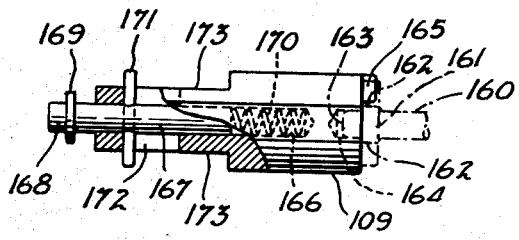
Fig. 17 is a view partially in section showing the printing roller detached.

The printing roller 109 is also preferably mounted for quick detachment from the printing frame to facilitate replacement of type and this roller, as shown in Fig. 17, has a detachable connection at one end to the sprocket 116 through a shaft 160 attached to the sprocket and journaled in a side wall 108 of the printing frame. The shaft 160 has a disk 161 adjacent the inner face of the wall 108 and this disk is provided with diametrically opposite slots 162 and with a projection 163 that is received in an axial bore 164 at one end of the roller 109. A lug 165 that projects from the end of the roller 109 is engageable in either of the slots 162 to key the roller to the shaft 160. The roller 109 has a bore 166 extending axially from its opposite end which slidably receives a shaft 167. The shaft 167 has an outer end portion 168 that is received in an opening in a side wall 108 and a flange 169 that engages with the side wall. A spring 170 in the bore 166 exerts an outward pressure on the shaft 167 and the roller 109 is keyed to the shaft 167 by a cross pin 171 that extends through diametrically opposite longitudinal slots 172 in the roller 109. The end of the roller 109 in which the slots 172 are formed has flat faces 173 which afford access to the ends of the pin 171 so that the pin can be drawn inwardly to release the shaft 167 from the side wall so that the roller 109 can be quickly and easily detached from or replaced in the printing frame.

The label strip passes under the roller 45 and over the roller 41 so that the face of the strip printed upon by the type 110 is the face which engages the feed drum 41. In order to prevent smearing of the fresh ink, portions 174 of the drum 41 which register with the printed matter are cut away so that the freshly printed portions of the label will not contact the drum. These cut away portions 174 may be flat, concave or of any convenient shape, it being merely necessary to relieve the drum surface at points intermediate the driving projections 42 to enable the printed matter to be held out of contact with the drum surface.

The label strip may be coated on one face with a suitable thermoplastic adhesive, in which case the vertical guide plate 22 will preferably be provided with a heater 176 and the plunger 32 may be provided with a heater 177 so that the coated face of the label is fused or partially fused before and during its application to the package. The guide plate 30 may also be provided with a heater 175 to soften the wax or other thermoplastic coating of the package wrapper immediately prior to application of the label.

In the operation of the machine the cam shaft 81 is continuously driven in timed relation to the mechanism that advances articles to their label receiving position, and cyclically operates all of the labeling mechanism except the label strip feed device. During each rotation of the shaft 81 the article intercepting stop 35 is moved into and out of article intercepting position by the cam 83, the arm 47 is actuated by the cam 86 to clamp the label strip A to the roller 45 and to release the strip, the shear bar 59 is reciprocated by the cam 85 and the plunger 32 and the loop forming roller 43 are operated by the cam 84. The label feed drum 41 is also actuated by the cam shaft but its operation is controlled by the trip 132 that is engaged by articles approaching their label receiving position and that retracts the guard 124 to release the actuating pawl 119 and permit it to engage the ratchet 118 to impart a turning movement to the drum that will advance the label strip one label length.

The operation of the feed drum occurs while the shear bar 59 and plunger 32 are in retracted position and after slack has been formed in the label strip by actuation of the loop forming roller 43. The slack loop is formed by the roller 43, the shear bar 59 is actuated to sever a label and the plunger 32 is advanced to apply the label while the label strip is clamped to the guide roller 45 by the printing roller 109 and during the retracting movement of the pawl 119. In order to prevent overrunning of the feed drum 41 suitable means is provided for applying a frictional resistance to turning movement of the drum. As shown in Figs. 4 and 6, a brake block 178 engages a side face of the drum 41. The block 178 is attached to a screw 179 threaded in the frame side wall 19 and held in adjusted position by a lock nut 180.

It is to be understood that in accordance with the provisions of the patent statutes, variations and modifications of the specific devices herein shown and described may be made without departing from the spirit of the invention.

What we claim is:

1. A labeling machine comprising an article runway having a continuously driven endless article carrying belt, a labeling mechanism mounted alongside said runway and including an article stop and label applying means, said label applying means comprising a reciprocating label applying plunger, feeding means for delivering labels one at a time into the space between the plunger and article, means independent of the articles on said belt and operating at predetermined time intervals for advancing said stop to article intercepting position, reciprocating said plunger and retracting said stop, means timed with respect to said operating means for delivering articles to said belt, and means controlled by an article approaching the stop for operating said feeding means.

2. A labeling machine comprising an article runway having a continuously driven endless article carrying belt, a labeling mechanism mounted alongside said runway and including an article stop and label applying means, said label applying means comprising a reciprocating label applying plunger, feeding means for delivering labels one at a time into the space between the plunger and article, means independent of the articles on said belt and operating at predetermined time intervals for advancing said stop to article intercepting position, reciprocating said plunger and retracting said stop, means controlled by each article as it approaches said mechanism for actuating said label feeding means to deliver a label to said plunger, and a continuously driven endless flight conveyor for delivering articles to said belt at intervals corresponding to said predetermined time intervals.

3. A labeling machine comprising an article runway having side walls between which articles are guided, one of said walls having an opening through which labels may be moved into engagement with the articles, a continuously driven endless article engaging belt in said runway adjacent said opening, means for delivering articles at predetermined time intervals to said belt, a label applying means including a member movable into and out of said opening for applying labels to articles in said runway, a stop movable into and out of an article intercepting position where it stops an article in position to receive a label through said opening, means independent of the delivery of said articles and operating continuously in timed relation with respect to said article delivering means for actuating said stop and said label applying means at predetermined time intervals, and means controlled by each article approaching said opening for feeding a label to said label applying means.

4. A labeling machine comprising an article runway having side walls between which articles are guided, one of said walls having an opening through which labels may be moved into engagement with the articles, a continuously driven endless article engaging belt in said runway adjacent said opening, a continuously driven flight conveyor for delivering articles at predetermined time intervals to said belt, a label applying means including a member movable into and out of said opening for applying labels to articles in said runway, a stop movable into and out of an article intercepting position where it stops an article to receive a label through said opening, mechanism geared to said flight conveyor for operating said stop and said label applying means in timed relation to said article delivering conveyor independently of the presence of articles on said belt and said conveyor, a label feeding mechanism operable intermittently to deliver a label to said label applying means, and a trip actuated by articles approaching said opening for controlling the operation of said label feeding mechanism.

5. A labeling machine comprising a label applying plunger having a short label applying stroke, means including a continuously driven article supporting belt for advancing articles successively into the path of said plunger, a stop movable into the path of an article on said belt to stop the same in a label receiving position in the path of said plunger, an intermittently operable label strip feeding mechanism for advancing the leading end of the label strip into the space between the plunger and article and operable upon each actuation to advance the strip one label length, a cutter for severing a label from said strip after each operation of said label feeding mechanism, a continuously operating actuating mechanism geared to said article advancing means and independent of the articles on said belt for intermittently and sequentially operating said stop, said cutter and said label applying plunger, and means controlled by each article as it approaches said stop for actuating said strip feeding mechanism.

6. A labeling machine comprising a label applying plunger having a short label applying stroke, means including a continuously driven article supporting belt for advancing articles successively into the path of said plunger, a stop movable into the path of an article on said belt to stop the same in a label receiving position in the path of said plunger, a label strip feeding mechanism arranged to advance the leading end of the label strip into the space between the plunger and article and operable intermittently to advance the strip one label length, a cutter for severing a label from said strip after each operation of said label feeding mechanism, a continuously operating actuating mechanism geared to said article advancing means for operating said stop, said cutter and said plunger intermittently and sequentially, actuating means for said strip feeding mechanism normally disconnected from said article advancing means, and means including a trip in the path of articles approaching said label receiving position for establishing a driving connection between said article advancing means and said label feed mechanism to impart a feed movement thereto.

7. A labeling machine comprising an article runway having side walls between which articles are guided, one of said side walls having an opening, a label applying plunger movable laterally into and out of said opening, a bottom plate on which said plunger slides, a label strip feeding means including an indexing drum above said opening, a vertical guideway extending downwardly from said drum to said opening outwardly of said wall and closely adjacent thereto, means above said plunger for severing labels from said strip, a continuously driven belt for moving articles past said opening, a movable member engageable with articles to stop them in label receiving position, means for delivering articles to said belt at predetermined time intervals, means independent of the articles delivered by said belt for operating said stop, said severing means and said plunger sequentially in timed relation to said article delivering means, and means controlled by each article approaching said stop for actuating said indexing drum to advance said strip one label length prior to actuation of said label severing means.

8. A labeling machine comprising means for rotatably supporting a roll of label strip that has regularly spaced notches, an indexing drum having equiangularly spaced peripheral projections that are engageable in said label strip notches, label severing means, means for guiding said strip from said drum to said severing means, label applying means positioned to receive labels detached from said strip by said severing means, an arcuate guide member closely and circumferentially overlying said drum between said laterally spaced projections to maintain driving engagement between the projections of said drum and the notches of the label strip, intermittently operable means for turning said drum through an angle corresponding to the angular spacing of said projections at intervals and with dwell periods between successive turning movements, intermittently operable means between said roll and said drum for clamping said strip to hold the same against endwise movement during said dwell periods and for releasing said strip during turning movements of said drum, and means operable at predetermined time intervals and while the label strip is so held to form a slack loop in said strip between said roll and said holding means and for simultaneously actuating said severing means to sever a label from said strip.

9. A labeling machine comprising means for supporting a label strip having an adhesive coated face and an uncoated face, an indexing drum having a periphery that conforms substantially to a cylindrical surface except for circumferentially spaced strip engaging projections and circumferentially spaced portions that are depressed with respect to said cylindrical surface, means for guiding said strip from said support and onto said drum with its coated face outermost, means between said support and said drum for printing on portions of the uncoated face of said strip that register with said depressed portions of said drum, means for driving said drum, label severing means to which the strip passes from said drum, means for actuating said severing means in timed relation to the travel of said strip to sever labels from the leading end of said strip, means for supporting articles to be labeled, and means for applying the severed labels to said articles.

10. A labeling machine comprising means for supporting a label strip having an adhesive coated face and an uncoated face, an indexing drum having a periphery that conforms substantially to a cylindrical surface except for circumferentially spaced strip engaging projections and circumferentially spaced portions that are depressed with respect to said cylindrical surface, means for guiding said strip from said support and onto said drum with its coated face outermost, intermittently operable means for turning said drum to advance said strip one label length at intervals and with dwell periods between successive turning movements, means between said support and said drum and operable during said dwell periods for printing on portions of the uncoated face of said strip that subsequently register with said depressed portions of said drum, means operable during each dwell period for severing a label from the leading end of the strip, and label applying means receiving the labels from said label severing means.

11. A labeling machine comprising means for rotatably supporting a roll of label strip that has an adhesive coated face and an uncoated face and that has regularly spaced notches, an indexing drum having equiangularly spaced peripheral projections that are engageable with said label strip notches and flattened portions intermediate said projections, label severing means, means for guiding said strip from said drum to said severing means, label applying means that receives labels severed from the leading end of the strip by said severing means, guiding means overlying said drum for maintaining driving engagement of said projections in said notches, intermittently operable means for turning said drum through an angle corresponding to the angular spacing of said projections with dwell periods between actuations, means operable during each dwell period to actuate said severing means, and means interposed between said drum and said roll support for printing on portions of the uncoated face of said strip that register with said flattened portions of the drum periphery.

12. A labeling machine comprising means for rotatably supporting a roll of label strip that has an adhesive coated face and an uncoated face and that has regularly spaced notches, an indexing drum having equiangularly spaced peripheral projections that are engageable with said label strip notches and flattened portions intermediate said projections, label severing means, means for guiding said strip from said drum to said severing means, label applying means that receives labels severed from the leading end of the strip by said severing means, guiding means overlying said drum for maintaining driving engagement of said projections in said notches, intermittently operable means for turning said drum through an angle corresponding to the angular spacing of said projections with dwell periods between actuations, means operable during each dwell period to actuate said severing means, a guide member engaging the coated face of said strip between said roll support and drum, a combined printing and clamping member pressing said strip against said member to hold the same against endwise movement during said dwell period, said printing member being positioned to engage with portions of the uncoated face of said strip that register with said flattened portions of said drum.

13. A labeling machine comprising an article runway having a continuously driven endless article carrying belt, a labeling mechanism mounted alongside said runway comprising a label applying means and a stop movable into and out of a position for intercepting articles on said belt and stopping them in label receiving position, means for advancing said stop to article intercepting position, actuating said label applying means and then retracting said stop, and means for adjusting said stop longitudinally of the conveyor to aline articles of different sizes with said label applying means.

14. A labeling machine comprising an article runway having a continuously driven endless article carrying belt, a labeling mechanism mounted alongside said runway comprising a label applying means and a stop movable into and out of a position for intercepting articles on said belt and stopping them in label receiving position, means independent of the articles carried by said belt and operating at predetermined time intervals for advancing said stop to article intercepting position, actuating said label applying means and retracting said stop, means timed with respect to said operating means for delivering articles to said belt, and means for adjusting said stop longitudinally of the conveyor to aline articles of different sizes with said label applying means.

15. A labeling machine comprising an article runway having a continuously driven endless article carrying belt, a labeling mechanism mounted alongside said runway and including an article stop and label applying means, means for delivering articles to said belt, and means independent of the delivery of said articles for advancing said stop at predetermined time intervals to article intercepting position, actuating said label applying means while said stop is in said intercepting position, and retracting said stop after said label applying means has been actuated, said first-named means being timed with respect to said operating means for delivering articles to said belt at intervals corresponding to the intervals between movements of said stop to said intercepting position so that said articles engage said stop when it is in said intercepting position.

16. A labeling machine comprising an article runway having a continuously driven endless article carrying belt, a labeling mechanism mounted alongside said runway and including an article stop and label applying means, an endless flight conveyor geared to said labeling mechanism for delivering articles to said belt, and means independent of the delivery of said articles and operating at predetermined time intervals for advancing said stop to article intercepting position, thereafter actuating said label applying means, and retracting said stop after actuation of said label applying means, said conveyor delivering articles to said belt for engagement with said stop at intervals corresponding to the intervals between operations of said labeling mechanism so that each article engages the stop when it is in article intercepting position.

17. A labeling machine comprising means for rotatably supporting a roll of label strip that has regularly spaced notches, an indexing drum having spaced peripheral projections that are engageable in said label strip notches, label severing means, means for guiding said strip from said drum to said severing means, label applying means positioned to receive labels detached from said strip by said severing means, means for maintaining driving engagement between the projections of said drum and the notches of the label strip, intermittently operable means for turning said drum to advance said strip one label length with dwell periods between successive turning movements, intermittently operable printing means between said roll and said drum for clamping said strip to hold the same against endwise movement during said dwell periods and for releasing said strip during turning movements of said drum, and means operable at predetermined time intervals and while the label strip is so held to form a slack loop in said strip between said roll and said holding means and for actuating said severing means to sever a label from said strip.

References Cited in the file of this patent

UNITED STATES PATENTS

| Number | Name | Date |
| --- | --- | --- |
| 1,941,597 | Cavagnaro | Jan. 2, 1934 |
| 2,329,669 | Tuthill | Sept. 14, 1943 |
| 2,482,711 | Jensen | Sept. 20, 1949 |
| 2,542,282 | Lissimore | Feb. 20, 1951 |
| 2,565,975 | Lissimore | Aug. 28, 1951 |
| 2,569,101 | Hoppe | Sept. 25, 1951 |
| 2,575,887 | Nitchie | Nov. 20, 1951 |
| 2,594,679 | Pohl | Apr. 29, 1952 |